(12) United States Patent
Arnal et al.

(10) Patent No.: US 10,122,552 B2
(45) Date of Patent: Nov. 6, 2018

(54) TRANSMISSION AND RECEPTION METHODS FOR A BINARY SIGNAL ON A SERIAL LINK

(71) Applicant: STMicroelectronics (Rousset) SAS, Rousset (FR)

(72) Inventors: Christophe Arnal, Saint Vallier de Thiey (FR); Roland van der Tuijn, Mouans-Sartoux (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 7 days.

(21) Appl. No.: 14/853,520

(22) Filed: Sep. 14, 2015

(65) Prior Publication Data

US 2016/0164701 A1   Jun. 9, 2016

(30) Foreign Application Priority Data

Dec. 4, 2014  (FR) ...................................... 14 61892

(51) Int. Cl.
*H04L 7/06* (2006.01)
*H04L 25/02* (2006.01)
*H04B 10/079* (2013.01)
*G06F 13/40* (2006.01)

(52) U.S. Cl.
CPC ...... *H04L 25/0262* (2013.01); *G06F 13/4081* (2013.01); *H04B 10/0795* (2013.01)

(58) Field of Classification Search
CPC ....... H03K 7/08; H04L 25/4902; H03F 3/217; H03F 2200/351; G06F 1/025
USPC .......................................... 375/238, 354–376
See application file for complete search history.

(56) References Cited

U.S. PATENT DOCUMENTS

| | | | | |
|---|---|---|---|---|
| 4,797,951 A | * | 1/1989 | Duxbury | H04J 3/0626 375/260 |
| 4,841,549 A | * | 6/1989 | Knapp | H04J 3/0614 375/362 |
| 4,888,791 A | * | 12/1989 | Barndt, Sr. | H04L 7/033 327/1 |
| 5,185,765 A | * | 2/1993 | Walker | H04L 27/2035 329/312 |
| 5,315,299 A | * | 5/1994 | Matsumoto | H03M 5/145 341/53 |
| 5,459,751 A | * | 10/1995 | Okamoto | H03K 9/00 341/178 |

(Continued)

OTHER PUBLICATIONS

"Manchester Coding Basics," Atmel Corporation, Application Note, Sep. 2009, 24 pages.

(Continued)

*Primary Examiner* — James M Perez
(74) *Attorney, Agent, or Firm* — Slater Matsil, LLP

(57) ABSTRACT

A method can be used for transmission of at least one packet of at least one bit over a serial link capable of taking two different states respectively associated with the two possible logical values of the at least one transmitted bit. Starting from a transmission start time of the at least one bit and up to the expiration of a first portion of a bit time associated with the at least one bit, the link is placed in one of its states depending on the logical value of the at least one bit. Upon the expiration of the first portion of this bit time, a first additional transition is generated over the link so as to place the link in its other state up to the expiration of the bit time.

27 Claims, 5 Drawing Sheets

(56) References Cited

U.S. PATENT DOCUMENTS

| | | | | |
|---|---|---|---|---|
| 5,473,633 A * | 12/1995 | Fischer | ............... | B64G 1/26 327/31 |
| 5,499,247 A * | 3/1996 | Matsuda | ............ | H04L 1/0057 340/3.1 |
| 5,504,757 A * | 4/1996 | Cook | ............... | H04L 12/40078 370/468 |
| 5,588,023 A * | 12/1996 | Ho | ............ | H04L 27/30 341/53 |
| 5,623,522 A * | 4/1997 | Ito | ............ | H04L 25/40 370/305 |
| 5,654,983 A * | 8/1997 | Sauser, Jr. | ............ | H04L 25/0262 375/225 |
| 5,657,347 A * | 8/1997 | Mori | ............ | H04L 7/044 375/225 |
| 5,661,736 A * | 8/1997 | Sferrazza | ............ | H04L 7/0008 714/55 |
| 5,740,199 A * | 4/1998 | Sibigtroth | ............ | H04L 5/16 370/212 |
| 5,774,452 A * | 6/1998 | Wolosewicz | ............ | H04H 20/31 370/212 |
| 5,787,132 A * | 7/1998 | Kishigami | ............ | H04L 7/042 370/304 |
| 5,790,607 A * | 8/1998 | Burke | ............ | H04L 7/0334 370/503 |
| 5,878,079 A * | 3/1999 | Mori | ............ | H04L 7/044 375/225 |
| 5,903,607 A * | 5/1999 | Tailliet | ............ | H04B 3/548 340/12.37 |
| 5,963,194 A * | 10/1999 | Umeda | ............ | G01S 3/784 345/157 |
| 6,018,513 A * | 1/2000 | Okamoto | ............ | H04L 12/40013 340/12.16 |
| 6,064,697 A * | 5/2000 | Yoshikawa | ............ | H03M 5/145 375/242 |
| 6,181,741 B1 * | 1/2001 | Nakanishi | ............ | G08C 19/28 370/205 |
| 6,321,982 B1 * | 11/2001 | Gaultier | ............ | G06K 7/0008 235/375 |
| 6,336,181 B1 * | 1/2002 | Fuzisawa | ............ | G06F 13/385 710/71 |
| 6,351,489 B1 * | 2/2002 | Tetzlaff | ............ | G06F 13/4072 327/35 |
| 6,385,210 B1 * | 5/2002 | Overberg | ............ | H04L 12/413 370/447 |
| 6,393,502 B1 * | 5/2002 | Meyer | ............ | G06F 13/4059 365/221 |
| 6,560,279 B1 * | 5/2003 | Renz | ............ | G08C 19/22 340/12.16 |
| 6,775,324 B1 * | 8/2004 | Mohan | ............ | G11B 20/1411 329/312 |
| 6,873,642 B1 * | 3/2005 | Fey | ............ | H04L 25/493 375/238 |
| 6,944,248 B2 * | 9/2005 | Sullivan | ............ | H04L 25/0262 375/225 |
| 7,272,059 B2 * | 9/2007 | Vimercati | ............ | G11C 7/067 365/196 |
| 7,333,536 B2 * | 2/2008 | Sinha | ............ | H04L 25/0262 375/225 |
| 7,336,706 B2 * | 2/2008 | Krafft | ............ | H03K 5/1252 375/219 |
| 7,353,442 B2 * | 4/2008 | Bahl | ............ | G11C 29/006 365/201 |
| 7,363,129 B1 * | 4/2008 | Barnicle | ............ | G08C 17/02 701/1 |
| 7,418,031 B2 * | 8/2008 | Jha | ............ | H04L 43/00 370/232 |
| 7,426,123 B2 * | 9/2008 | Leung | ............ | H02M 3/33515 323/283 |
| 7,729,427 B2 * | 6/2010 | Kwok | ............ | H04B 3/542 326/30 |
| 7,787,576 B2 * | 8/2010 | Foerster | ............ | G01R 13/0254 370/498 |
| 7,864,078 B2 * | 1/2011 | Rohatschek | ............ | H04L 7/0331 341/51 |
| 8,044,743 B2 * | 10/2011 | Greiss | ............ | H03F 3/217 330/10 |
| 8,275,080 B2 * | 9/2012 | Jordan | ............ | H04B 1/707 375/354 |
| 8,284,830 B2 * | 10/2012 | Lee | ............ | H03K 7/08 318/599 |
| 8,350,497 B2 * | 1/2013 | Peting | ............ | H05B 37/0245 315/169.3 |
| 8,401,394 B2 * | 3/2013 | Walewski | ............ | H04B 10/1141 375/238 |
| 8,564,365 B2 * | 10/2013 | Dang | ............ | H04L 25/4902 329/312 |
| 8,633,779 B2 * | 1/2014 | Pfaffinger | ............ | H03K 7/08 332/109 |
| 8,675,742 B2 * | 3/2014 | Zhang | ............ | H04L 12/4633 375/219 |
| 8,766,955 B2 * | 7/2014 | Loveridge | ............ | G09G 5/006 345/204 |
| 8,767,777 B2 * | 7/2014 | Kobayashi | ............ | G06F 3/14 370/276 |
| 8,788,867 B2 * | 7/2014 | Webb, III | ............ | G06F 1/0321 713/500 |
| 8,850,259 B2 * | 9/2014 | Webb, III | ............ | G06F 1/0321 713/500 |
| 8,917,804 B2 * | 12/2014 | Sano | ............ | H03L 7/0807 375/238 |
| 9,306,605 B1 * | 4/2016 | Van Der Tuijn | ............ | H04B 15/00 |
| 2001/0055311 A1 * | 12/2001 | Trachewsky | ............ | H04L 1/0003 370/445 |
| 2002/0071484 A1 * | 6/2002 | Spichale | ............ | H04L 25/4902 375/238 |
| 2002/0084841 A1 * | 7/2002 | Taguchi | ............ | B60C 23/0408 329/312 |
| 2002/0101884 A1 * | 8/2002 | Pohlmeyer | ............ | H04L 7/044 370/509 |
| 2002/0146068 A1 * | 10/2002 | Sumitomo | ............ | H04L 25/45 375/219 |
| 2002/0172315 A1 * | 11/2002 | Sullivan | ............ | H04L 25/0262 375/377 |
| 2002/0181578 A1 * | 12/2002 | Takano | ............ | H03M 5/08 375/238 |
| 2004/0122490 A1 * | 6/2004 | Reinke | ............ | A61N 1/025 607/60 |
| 2004/0213169 A1 * | 10/2004 | Allard | ............ | G06K 7/10297 370/276 |
| 2005/0246602 A1 * | 11/2005 | Bahl | ............ | G11C 29/006 714/733 |
| 2005/0286627 A1 * | 12/2005 | Tabatabaei | ............ | G01R 29/26 375/238 |
| 2005/0286643 A1 * | 12/2005 | Ozawa | ............ | H03L 7/087 375/242 |
| 2006/0023781 A1 * | 2/2006 | Leung | ............ | H02M 3/157 375/238 |
| 2006/0245515 A1 * | 11/2006 | Tachi | ............ | H04L 7/0331 375/293 |
| 2007/0040657 A1 * | 2/2007 | Fosler | ............ | H02J 1/08 340/333 |
| 2007/0245217 A1 * | 10/2007 | Valle | ............ | H03M 13/1102 714/758 |
| 2007/0291887 A1 * | 12/2007 | Ishimoto | ............ | H04L 25/05 375/371 |
| 2008/0049606 A1 * | 2/2008 | Rhelimi | ............ | H04L 5/1423 370/212 |
| 2008/0095290 A1 * | 4/2008 | Leung | ............ | H04B 1/406 375/371 |
| 2008/0123730 A1 * | 5/2008 | Robinson | ............ | H04L 5/16 375/238 |
| 2009/0046773 A1 * | 2/2009 | Scherr | ............ | H04L 5/1484 375/238 |
| 2009/0141789 A1 * | 6/2009 | Warren | ............ | H04L 1/1664 375/238 |
| 2009/0185615 A1 * | 7/2009 | Someya | ............ | G04R 20/10 375/238 |

(56) References Cited

U.S. PATENT DOCUMENTS

| | | | | |
|---|---|---|---|---|
| 2009/0224719 | A1* | 9/2009 | Shimada | H02P 8/14 318/696 |
| 2011/0103275 | A1* | 5/2011 | Rhelimi | H04L 25/4902 370/296 |
| 2011/0150065 | A1* | 6/2011 | Tailliet | G06F 13/4295 375/224 |
| 2011/0166856 | A1* | 7/2011 | Lindahl | G10L 15/20 704/233 |
| 2012/0051241 | A1* | 3/2012 | Mori | H04L 12/12 370/252 |
| 2012/0275454 | A1* | 11/2012 | Chen | H04L 1/0061 370/389 |
| 2013/0169173 | A1* | 7/2013 | Chen | H05B 37/02 315/186 |
| 2013/0336339 | A1* | 12/2013 | Valiani | H04L 12/403 370/503 |
| 2014/0036988 | A1* | 2/2014 | Kashima | H04L 25/4902 375/238 |
| 2014/0140390 | A1* | 5/2014 | Kashima | H04L 25/4902 375/238 |
| 2014/0169419 | A1* | 6/2014 | Kashima | H04L 25/4902 375/219 |
| 2014/0169443 | A1* | 6/2014 | Karino | H04L 25/4902 375/238 |
| 2014/0241414 | A1* | 8/2014 | Reidl | H04L 25/4902 375/238 |
| 2014/0274203 | A1* | 9/2014 | Ganong, III | H04W 52/0251 455/556.1 |
| 2014/0358552 | A1* | 12/2014 | Xu | G06F 1/3234 704/275 |
| 2015/0008967 | A1* | 1/2015 | Zhu | H03L 7/0805 327/158 |
| 2015/0131497 | A1* | 5/2015 | Arnal | G06F 13/4291 370/282 |
| 2015/0187209 | A1* | 7/2015 | Brandt | G08C 19/00 340/12.22 |
| 2015/0236844 | A1* | 8/2015 | Pan | H04L 7/0008 370/503 |
| 2016/0036684 | A1* | 2/2016 | Jones | H04L 43/50 370/252 |
| 2016/0050089 | A1* | 2/2016 | Strasser | H04L 25/4902 375/238 |
| 2016/0094312 | A1* | 3/2016 | Fredriksson | H04L 12/40 714/807 |
| 2016/0306409 | A1* | 10/2016 | Mori | H04B 1/04 |
| 2017/0139872 | A1* | 5/2017 | Ladd | G06F 13/362 |
| 2017/0141604 | A1* | 5/2017 | Park | H02J 7/025 |

OTHER PUBLICATIONS

Kartalopoulos, S.V., "Digital Transmission and Coding Techniques," Introduction to DWDM Technology—Data in a Rainbow, Chapter 12, Dec. 1999, pp. 167-172.

* cited by examiner

TRANSMISSION AND RECEPTION METHODS FOR A BINARY SIGNAL ON A SERIAL LINK

This application claims priority to French Application No. 1461892, filed on Dec. 4, 2014, which application is hereby incorporated herein by reference.

TECHNICAL FIELD

Embodiments of the present invention relate to methods for transmission and for receiving a binary signal over a serial link, in particular, for the detection of the speed of transmission or baud rate, and corresponding devices.

BACKGROUND

Each transmitter/receiver in communication must initially define the speed of transmission in order to begin the communication. When the speed of transmission needs to be modified, the communication must be interrupted, protocol messages must be exchanged, and there are often numerous timing constraints to be complied with before interrupting and restarting a communication, in particular when the packets of bits being exchanged are asynchronous, in other words timed by non-synchronized transmission and reception clocks.

The current mechanisms are based on synchronization binary patterns which must firstly be transmitted between the two devices.

The device receiving this synchronization pattern can for example compare it with reference patterns previously stored in a table ("look-up table") so as to deduce from this the real speed of transmission (baud rate).

Aside from the fact that the use of such synchronization patterns requires proprietary protocols, which represents an impediment to the interoperability between devices, this only allows the detection of the speed of transmission for the start of the communication, and furthermore from amongst a predefined set of transmission speeds, and assumes that this speed of transmission will remain constant for the entire duration of the communication.

Moreover, such a solution is completely ineffective when the speed of transmission has to be changed in the course of the communication.

SUMMARY

Various embodiments of the invention relate to the communication of binary information over a serial link capable of taking two different states respectively associated with the two possible logical values of the binary information being communicated, notably the communication of binary information between two universal asynchronous receiver/transmitters known by those skilled in the art under the acronym UART, in particular, with a view to the auto-detection of the speed of transmission at the start of the transmission and/or to a potential modification of this speed of transmission in the course of a communication.

In accordance with a preferred embodiment of the present invention, a method for the speed of transmission or the "baud rate" is generally expressed in bauds which represent the number of symbols transmitted per second (equivalent to the number of bits transmitted per second if each symbol corresponds to a single bit). This data rate allows the value of the bit time, in other words the duration of the time segment used for the transmission of the bit, to be defined.

According to one embodiment and its implementation, methods for transmission and reception are provided that allow, in the receiver, an auto-detection of the speed of transmission at the start of the communication together with an auto-detection of any potential modification of this speed of transmission in the course of the communication.

According to one embodiment and its implementation, in transmission, the idea is to use the final part of the bit time of a bit for generating a transition (or edge) over the link at the end of a portion of this bit time. This transition will be a kind of pre-warning of the imminent expiration of the bit time. Then, in reception, the detection of this transition will allow the receiver, in view of its knowledge of the value of the portion of bit time, to deduce from this the remaining period of time for receiving the current bit and, consequently, the speed of transmission.

Thus, according to one aspect, a method of transmission is provided for at least one packet of at least one bit over a serial link capable of taking two different states respectively associated with the two possible logical values of the at least one transmitted bit; the method comprises a first transmission processing comprising, starting from a transmission start time of the at least one bit and up to the expiration of a first portion of a bit time associated with the at least one bit, the placing of the link in one of its states depending on the logical value of the at least one bit and, upon the expiration of the first portion of this bit time, a generation of a first additional transition over the link so as to place the link in its other state up to the expiration of the bit time.

So as to avoid errors leading to the detection of false bits, it is preferable for the first additional transition to be sufficiently far from the middle of the bit time and from the final end of the bit time. Those skilled in the art will know how to adjust the value of the first portion of bit time as a function notably of the value of the clock signal. However, by way of example, the first portion of the bit time may be in the range between 60% and 90% of the bit time.

In general, the packet comprises several bits. In this case, according to one embodiment, the first transmission processing is implemented at least for the transmission of the first bit and the transmission of the second bit begins at the expiration of the bit time associated with the first bit.

This said, several variants are possible.

Thus, when the bit time associated with the first bit of the packet is longer than the bit time associated with the other bits of the packet and the bit time associated with the other bits of the packet may be determined, by a known relationship, from the bit time associated with the first bit of the packet, the first transmission processing may be implemented only for the transmission of the first bit.

Indeed, when this first bit, for example a bit referred to as "start bit", is sufficiently long, a single transition may be sufficient for detecting, in reception, the speed of transmission and consequently for correctly reading the following bits of the packet.

As a variant, when the bit time associated with all the bits of the packet are identical, or different for some of them but determinable by a known relationship, it is possible of generate additional transitions for the first bit of the packet and for certain other bits of the packet, for example the second and the fourth, which may then be sufficient for detecting, in reception, the speed of transmission with sufficient precision, and consequently for correctly reading the bits of the packet.

Thus, according to one embodiment, the first transmission processing is implemented for the transmission of the first bit and the transmission of at least one other bit of the packet comprises a second transmission processing comprising starting from the transmission start time of the at least one other bit and up to the expiration of a second period counted starting from the transmission start time of the first bit and equal to the sum of all the bit times associated with the bit(s) preceding the at least one other bit and of a second portion of the bit time associated with the at least one other bit, the placing of the link in one of its states depending on the logical value of the at least one other bit, and, upon the expiration of the second period, a generation of a second additional transition over the link so as to place the link in its other state up to the expiration of the bit time associated with the at least one other bit.

As a variant, when the bit time is not identical for all the packets, in other words for example when the speed of transmission changes in the course of the communication, the first transmission processing can be implemented for the transmission of each bit of the packet and the transmission of the current bit, from the second bit up to the last, then begins at the expiration of the bit time associated with the preceding bit.

According to another aspect, a method is provided for reception of at least one packet of at least one bit, carried over a serial link capable of taking two different states respectively associated with the two possible logical values of the at least one received bit, comprising a first reception processing comprising a detection of the occurrence of a first transition between the two states of the link after the reception start time of the at least one bit and a determination of a first period separating the reception start time and the time of occurrence of the first transition, the reception end time of the at least one bit being separated from the time of occurrence of the first transition by a first additional period equal to a first predetermined portion of the first period.

In the same way as the first portion of bit time was for example in the range between 60% and 90% of the bit time in transmission, during the reception, the first predetermined portion can be in the range between 10% and 70% of the first period (which corresponds to a percentage of the bit time in the range between 10% and 40%).

According to one embodiment in which the received packet comprises several bits, the first reception processing is implemented at least for the reception of the first bit, and the reception of the second bit begins at the expiration of the first additional period associated with the first bit.

According to one embodiment in which, when the bit time associated with the first bit of the received packet is longer than the bit time associated with the other bits of the received packet and the bit time associated with the other bits of the received packet may be determined, by a known relationship, from the bit time associated with the first bit of the received packet, the first reception processing may be implemented only for the reception of the first bit.

According to one embodiment in which all the bits of the received packet have the same bit time or have different bit times for some of them but determinable by a known relationship, the first reception processing is implemented for the reception of the first bit and the reception of at least one other bit of the packet comprises a second reception processing comprising a detection of the occurrence of a second transition between the two states of the link after the reception start time of the at least one other bit and a determination of a second period separating the reception start time of the first bit and the time of occurrence of the second transition. The reception end time of the at least one other bit is separated from the time of occurrence of the second transition by a second additional period equal to a second predetermined portion of the second period.

The first portion and the second portion may be identical.

According to one embodiment notably allowing a detection of a change of speed of transmission, potentially at each bit, the first reception processing is implemented for the reception of each bit of the received packet and the reception of the current bit, from the second bit up to the last, begins at the expiration of the additional period associated with the preceding bit.

According to another aspect, a processing unit is provided that is configured for transmitting at least one packet of at least one bit over a serial link capable of taking two different states respectively associated with the two possible logical values of the at least one transmitted bit.

According to one general feature of this other aspect, the processing unit comprises transmission processing unit configured for implementing the transmission method such as defined hereinbefore.

According to another aspect, a processing unit is provided that is configured for receiving at least one packet of at least one bit carried over a serial link capable of taking two different states respectively associated with the two possible logical values of the at least one received bit.

According to one general feature of this other aspect, the processing unit comprises reception processing unit configured for implementing the reception method such as defined hereinbefore.

The processing unit may comprise both a transmission processing unit and a reception processing unit.

Such a processing unit may, for example, be a universal asynchronous receiver/transmitter (UART).

BRIEF DESCRIPTION OF THE DRAWINGS

Other advantages and features of the invention will become apparent upon examining the detailed description of non-limiting embodiments and their implementations, and the appended drawings in which.

DETAILED DESCRIPTION OF ILLUSTRATIVE EMBODIMENTS

Figure 1:
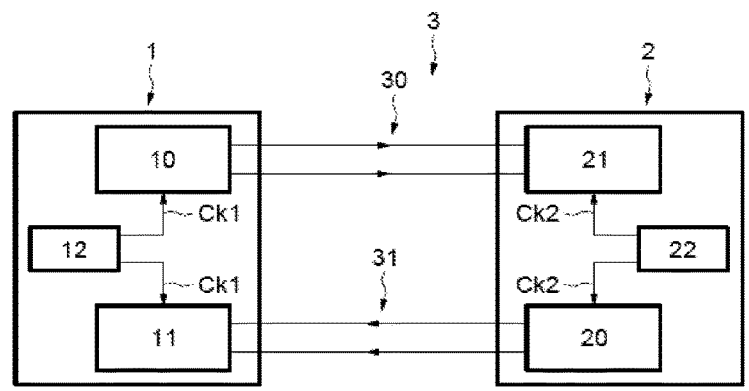
FIGS. 1 to 6 illustrate diagrammatically various embodiments of the invention and their implementations.

In FIG. 1, the reference 1 represents a processing unit configured for exchanging information, for example bits, in an asynchronous manner, with another processing unit 2, over a serial link 3 here comprising two wires 30 for the transmission from the unit 1 to the unit 2 and two wires 31 for the transmission from the unit 2 to the unit 1.

Each serial link 30, 31 is capable of taking two different states respectively associated with the two possible logical values of the transmitted bits. These two logical states result for example from the difference in potential between the data wire and the ground wire.

The processing unit 1 comprises transmission processing unit 10 and reception processing unit 11. These two units are timed by a clock signal CK1 coming from a generator 12. Similarly, the processing unit 2 comprises transmission processing unit 20 and reception processing unit 21 timed by a clock signal CK2 coming from a generator 22.

The transmission processing units (transmitters) 10, 20 are configured for implementing the transmission method, implementation examples of which will be described with reference to FIGS. 2 and 4 to 6.

Similarly, the reception processing units (receivers) 11, 21 are configured for implementing the reception method of one of the implementation examples which will be described with reference to FIGS. 3 to 6.

For this purpose, the transmission processing units and the transmission and reception processing units comprise elements with a conventional structure, such as for example shift registers and/or any other circuits capable of generating edges over the transmission link depending on the logical values of the bits to be transmitted, and/or any other circuits capable of analyzing the characteristics of the received frame, for example a microcontroller.

The processing units may for example be universal asynchronous receivers/transmitters (UART).

Figure 2:
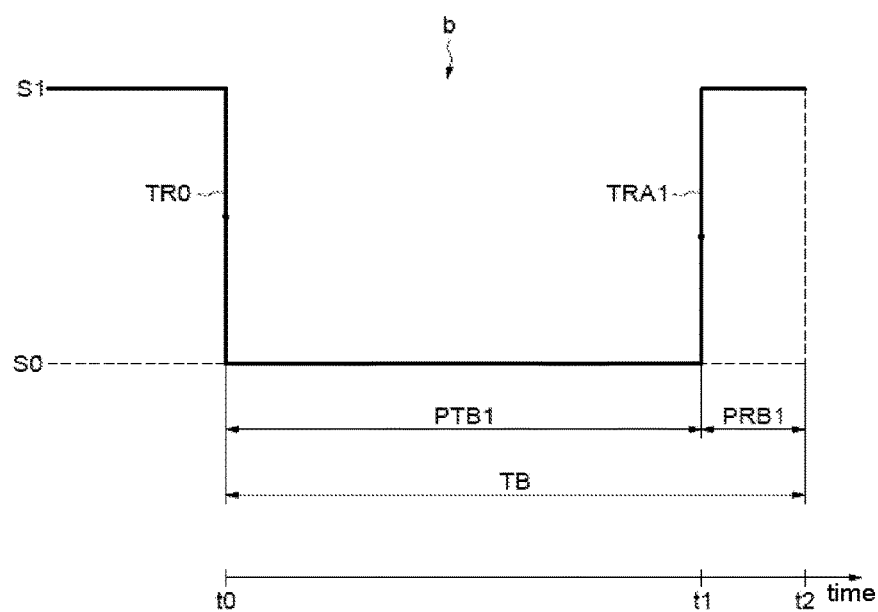

Reference is now more particularly made to FIG. 2 in order to illustrate one embodiment of a method for transmission of a bit b over the serial link.

It is assumed here that the logical value of the bit b is equal to 0 and that the transmission start time t0 of the bit b corresponds to a falling edge TR0 starting from the steady state S1 (here high state) of the link.

The bit b has a bit time TB.

A first portion PTB1 of the bit time TB equal to αTB is then defined.

The transmission processing unit 10 of the processing unit 1 then places the serial link in one of its states depending on the logical value of the bit b for the whole of the first portion of bit time PTB1. In the example described here, since the logical value of the bit b is 0, the link is placed in its state S0.

Then, upon the expiration of the portion PTB1, a first additional transition TRA1 is generated over the link so as to place it in its other state, in the present case the state S1, and this lasts up to the expiration of the bit time TB in other words during the portion PRB1 equal to (1−α)TB.

Figure 3:
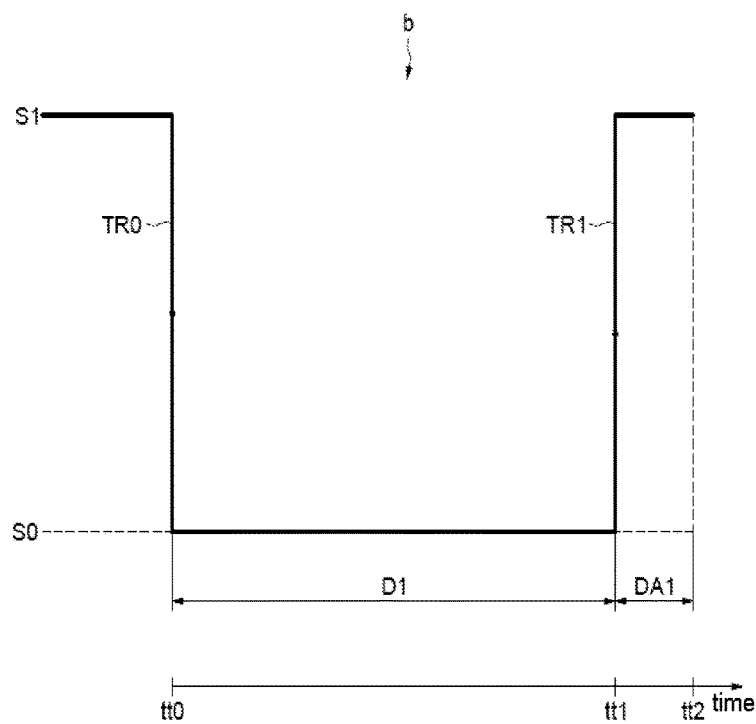

One embodiment of the reception processing of such a transmitted bit is illustrated in FIG. 3.

The reception processing unit 21 of the processing unit 2 knows the value of α.

The reception processing first of all comprises a detection of the time tt0 of the start of reception of the bit b, here typically corresponding to the occurrence of a falling edge TR0 from the steady state S1 of the link.

Then, the occurrence of a first transition TR1 between the two states of the link is detected, here between the state S0 and the state S1, after the time tt0.

This first transition takes place at the time tt1.

The reception processing unit of the processing unit then determines the first period D1 between the times tt0 and tt1.

The reception processing unit is from then on able to determine that the bit time TB of the received bit will be equal to D1/α and that the time tt2 of the end of reception of the bit b will be separated from the time tt1 of occurrence of the first transition TR1 by a first additional period DA1 equal to a first predetermined portion β of the first period D1, in this case defined by the formula (I) herein below:

$$DA1 = \frac{(1-\alpha)}{\alpha} D1 \quad (I)$$

$$\text{with } \beta = \frac{(1-\alpha)}{\alpha}.$$

It can therefore be seen that the use of an additional transition in the transmission phase situated towards the end of the bit time in reception allows the end of the reception of the bit to be anticipated and the bit time to be determined.

So as to reduce the risk of error in the detection of the bit time, it is preferable for the first additional transition TRA1 and, as a consequence the first transition TR1, to be situated sufficiently far from half way through the bit time and the end of the bit time. Those skilled in the art will be able to choose α taking into account these criteria notably as a function of the value of the clock signals used.

This said, by way of example, α may be chosen within the range between 0.6 and 0.9, for example equal to 0.75.

For this reason, β is in the range between 0.11 and 0.66, for example equal to 0.33.

In the examples in FIGS. 2 and 3, the time t0 of the start of transmission of the bit b and the time tt0 of the start of reception of the bit b have been represented by a falling edge TR0. However, it goes without saying that, depending on the logical value of the bit and/or on the steady state of the link, this transition TR0 could be a rising edge. Furthermore, in the case where several bits are transmitted successively, if the bit b-1 preceding the bit b has a logical value opposite to that of the bit b, then, for the bit b, there will be no transition TR0 following a transition TRA1 (in transmission) or a transition TR1 (in reception) generated during the bit time of the bit b-1. In this case, the time t0 of the start of transmission of the bit b will be the time of the end of transmission of the bit b-1 and the time tt0 of the start of reception of the bit b will be the time estimated for the end of reception of the bit b-1.

Figure 4:
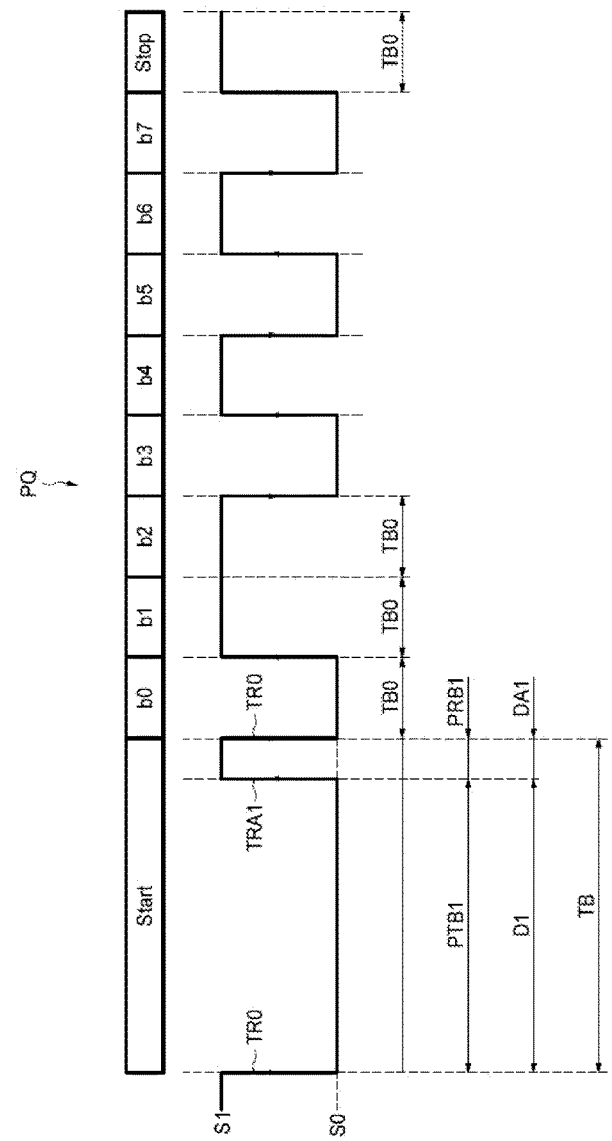

Reference is now more particularly made to FIG. 4 in order to illustrate one embodiment of a method of transmission applicable to a packet PQ of bits.

In the example described here, the packet is a frame of the type UART comprising a first bit referenced "start", which is a start bit followed by eight useful bits of data b0-b7 followed by a final bit referenced "stop".

The transmission processing illustrated in FIG. 2 is applied here only for the first bit start of the packet.

In fact, although it is theoretically possible for the bit time TB of the first bit start to be equal to the bit time TB0 of all the other bits of the packet PQ, it is preferable, so as to minimize the risk of error in the detection of the bit time in reception, for the bit time TB of the first bit start to be longer than the bit time TB0.

In practice, a bit time TB could be chosen to be equal to K times TB0, where K may be an integer or otherwise. K may, in particular, be a multiple N of the bit time TB0, where N may for example be chosen to be equal to 4.

The first additional transition TRA1 is, as indicated hereinbefore, generated upon the expiration of the portion PTB1 equal to αTB.

In reception, the time periods D1 and DA1 are determined as indicated hereinbefore with reference to FIG. 3 and the bit time TB is then equal to D1/α as explained hereinbefore.

Once the bit time TB has been determined, the bit time TB0 can be readily calculated by dividing the bit time TB by N.

Thus, the speed of transmission ("baud rate") is determined.

Nevertheless, the bits b0 at stop could have various bit times but determinable from the bit time TB by a known relationship of the receiver. Thus, each bit time $TB_i$ for the bits b0 at stop could be the product of TB with a coefficient $C_i$, $C_i$ being the coefficient associated with the bit of rank i and also known by the receiver. α remains identical for all the bits.

Figure 5:
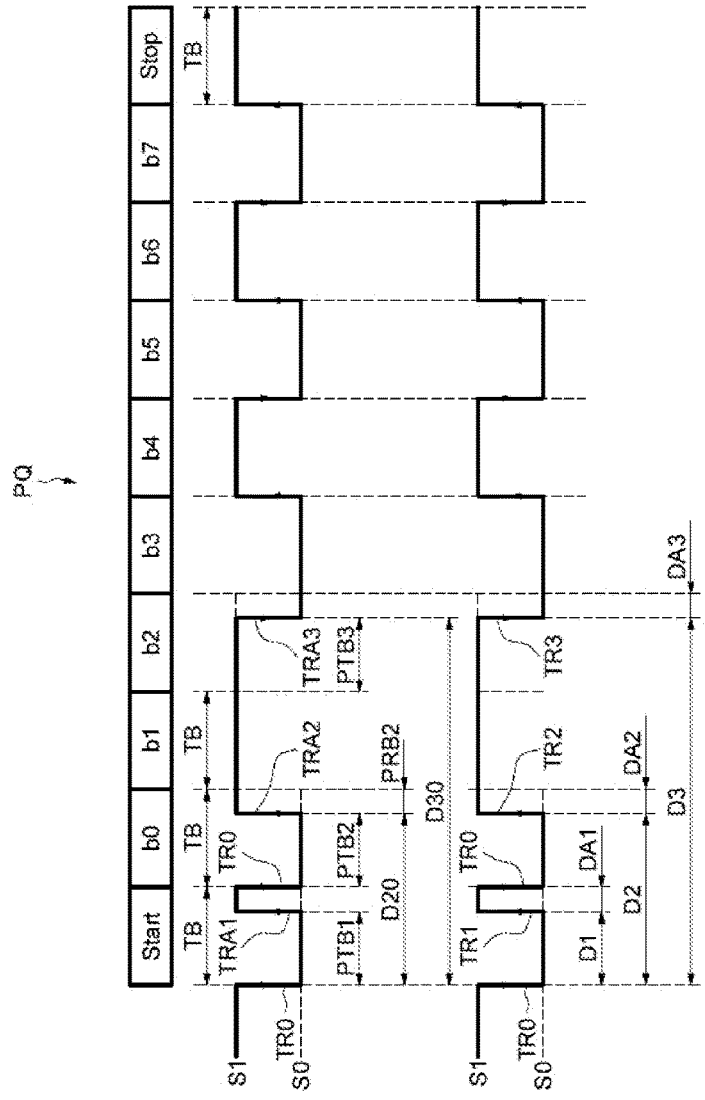

In the example illustrated in FIG. 5, the packet PQ is a UART frame comprising here again a first bit start followed by eight data bits b0-b7 followed by a final bit stop.

In this example, it is assumed that all the bits of the packet PQ have the same bit time as TB.

In this embodiment, so as to reduce the risk of error in the detection of the bit time in reception, and consequently in the detection of the speed of transmission (baud rate), the transmission processing unit will generate an additional transition, not only during the bit time of the first bit start, but also during certain other bits of the packet, in this case the bits b0 and b2.

More precisely, the first transmission processing, such as illustrated in FIG. 2, is applied for the first bit start leading to the generation of the first additional transition TRA1 at the end of the portion PTB1 equal to αTB.

As illustrated in the upper part in FIG. 5, a second transmission processing applied to the bit b0 comprises, starting from the transmission start time of this bit b0 and up to the expiration of a second period D20, which is this time counted starting from the transmission start time of the first bit start, the placing of the link in the state corresponding to the logical value of the bit b0, in this case the placing of the link in the state S0.

Accordingly, the link is placed in this state S0 during a second portion PTB2 of the bit time TB.

Although not indispensable, the duration of the portion PTB2 is preferably equal to the duration of the portion PTB1, for the sake of simplification.

PTB2 is consequently equal to αTB.

The second period D20 is consequently equal to the sum of the bit time TB associated with the start bit and of the second portion PTB2. D20 is therefore equal to (1+α)TB.

Upon the expiration of the second period D20, the transmission processing unit generates a second additional transition TRA2 so as to place the link in its state S1 up to the expiration of the bit time TB associated with the bit b0.

The link is therefore placed in its state S1 during the portion of bit time PRB2 here equal to (1−α)TB.

In view of the generation of the two additional transitions TRA1 and TRA2, the bit time TB will be able to be calculated with sufficient precision so as to be able to forego the generation of another additional transition within the bit b1.

On the other hand, it is preferable to re-generate a third additional transition TRA3 during the bit b2.

This third additional transition TRA3 is generated upon the expiration of a third period D30 again counted starting from the time of the start of the first bit start, this duration D30 being equal to the sum of bit times of preceding bits, in this case here three bit times TB, and of the portion PTB3 which is equal to αTB. D30 is therefore here equal to (3+α)TB.

In reception, as illustrated in the lower part in FIG. 5, the reception processing unit applies, for the first bit start, the reception processing such as that illustrated in FIG. 4, which allows not only the end of reception of the start bit to be determined but also a first determination of the bit time TB to be obtained by applying the formula TB=D1/α.

Then, the reception processing unit applies a second reception processing for the bit b0.

This second reception processing comprises a detection of the occurrence of a second transition TR2 over the link, here making it go from its state S0 to the state S1, after the reception time of the bit b0.

The reception processing unit then determines a second period D2 separating the reception time of the first bit start and the time of occurrence of this second transition TR2.

The reception processing unit can then carries out a new determination of the bit time TB which is equal to:

$$\left(\frac{1}{1+\alpha}\right)D2 \quad \text{(II)}$$

This second determination of the bit time is more accurate than the first which becomes obsolete.

Furthermore, the reception end time of the second bit b0 will be separated from the time of occurrence of the second transition TR2 by a second additional period DA2 which is equal to a second predetermined portion of the second period D2.

More precisely, the second additional period DA2 is equal to:

$$\left(\frac{1-\alpha}{1+\alpha}\right)D2 \quad \text{(III)}$$

The second reception processing is also applied for the fourth bit b2 of the packet PQ.

More precisely, the detection of the third transition TR3 allows the third period D3 to be determined still counted starting from the reception start time of the first bit start.

This allows a new estimation of the bit time TB to be obtained which is supplied by the formula (IV) hereinbelow:

$$TB = \left(\frac{1}{3+\alpha}\right)D3 \quad \text{(IV)}$$

This third determination of the bit time is more accurate than the second which, in turn, becomes obsolete.

The reception end time of the bit b2 will then be obtained at the end of the expiration of the third additional period DA3 which is obtained using the formula (V) hereinbelow:

$$DA3 = \left(\frac{1-\alpha}{3+\alpha}\right)D3 \quad \text{(V)}$$

Whereas in the embodiment in FIG. 5 which has just been described, the bit time TB was identical for all the bits, it could here again be different for at least some of them, or even for all the bits, as long as these bit times are determinable by a known relationship of the transmitter and of the receiver.

More precisely, it may for example be assumed that the bit time of each bit of the packet is equal to GiTBB, where TBB is a constant and Gi a coefficient associated with the bit of rank i in the packet PQ. The coefficients Gi are known by the transmitter and by the receiver, and α remains identical for all the bits but could be different for each bit as long as it is known to the transmitter and receiver.

Thus, taking once again the example in FIG. 5, the period D1 allows the bit time TB1 of the start bit to be determined in reception by the formula TB1=D1/α.

This bit time TB1 is furthermore equal to G1TBB (where G1 is the coefficient associated with the first bit start) which supplies a first determination for TBB equal to D1/(αG1).

A new estimation of TBB can be obtained in reception with the transition TR2 (second bit b0) and the formula TBB=D2/(G2(1+α)).

The bit time TB3 of the third bit b1 can then be determined by the reception processing unit via the formula TB3=G3TBB.

A new estimation of TBB can be obtained in reception with the transition TR3 (fourth bit) and the formula TBB=D3/(G4(3+α)).

This latter estimation of TBB will be retained for the determination by the reception processing unit of the bit times of the bits b3 at stop using the formula $G_i$TBB.

Figure 6:
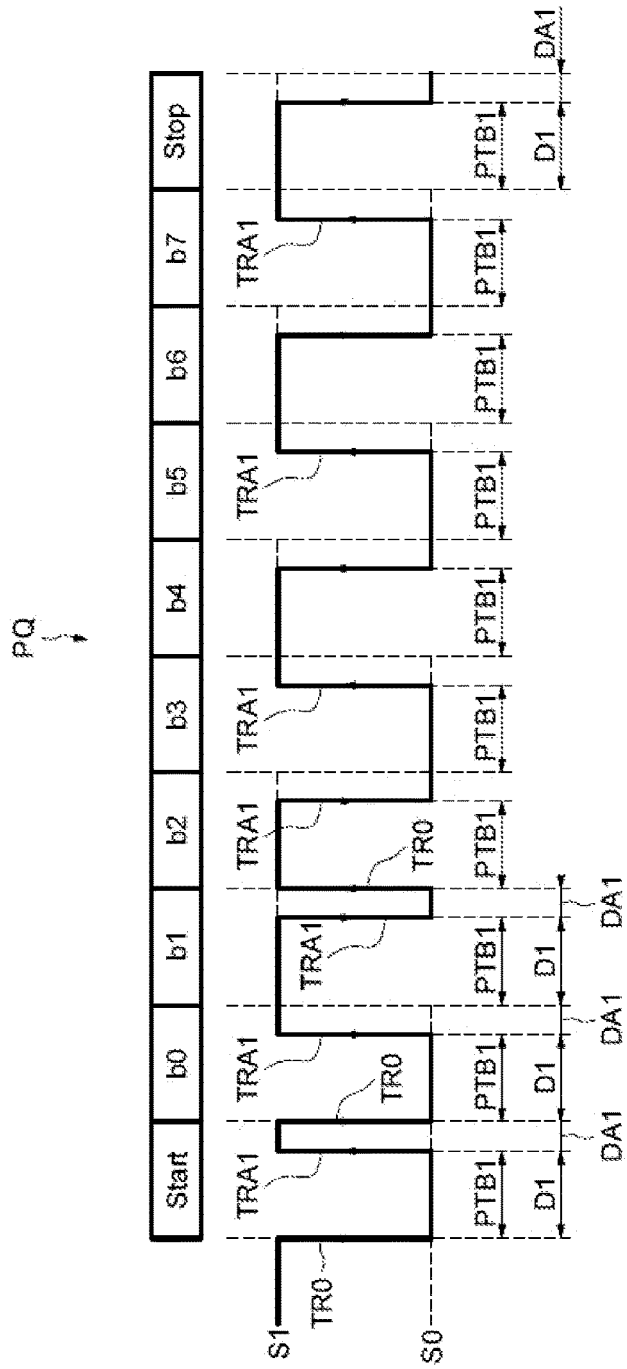

The embodiment illustrated in FIG. 6 is more particularly adapted when the speed of transmission (baud rate) changes in the course of the communication, and even when it changes for each transmitted bit.

For this FIG. 6, the packet of bits PQ is still a packet of the UART type but this time the bit time of each of the bits may be different.

Accordingly, the application is advantageously provided at the transmission, for each bit to be transmitted, the transmission processing such as that described with reference to FIG. 2 and, in reception, for each bit received, the reception processing such as that illustrated with reference to FIG. 3 by each time taking into account, as explained hereinbefore with reference to these figures, the manner in which the times of the start of transmission of a transmitted bit or of the start of reception of a received bit (absence or presence of a transition TR0) are determined.

In practice, the transmission processing unit will generate an additional transition TRA1 during each transmission of a bit, at the end of the portion PTB1. In the example described, for the purposes of simplification, PTB1 is identical for all the bits since it was assumed that the bit time was equal for all the bits. However, PTB1 could be different for at least some of the bits owing to the difference in the associated bit times. α can remain identical for all the bits but could be different for each bit as long as it is known to the transmitter and receiver.

In reception, the reception processing unit will determine, for each bit, the period D1, the additional period DA1, and will accordingly be able to determine the bit time associated with the bit in question.

The invention is not limited to the embodiments and their implementations which have just been described but encompasses all the variants of the latter.

Thus, although in everything that has been described the transmission or reception start time of the first bit of a packet was determined by the occurrence of a transition of the link starting from its steady state, it is perfectly possible for this transmission or reception start time to be supplied by a signal external to the link.

What is claimed is:

1. A method of transmitting a plurality of bits over a serial link that is capable of taking two different states respectively associated with two possible logical values of the transmitted bits, the method comprising:
    starting from a transmission start time of a start bit and up to expiration of a first portion of a bit time associated with the start bit, using a transmitter capable of transmitting at a plurality of different speeds of transmission, to place the link in one of the two different states depending on a logical value of the start bit; and
    upon expiration of the first portion of the bit time associated with the start bit, using the transmitter to generate a first additional transition over the link so as to place the link in the other one of the two different states up to an expiration of the bit time associated with the start bit, wherein a duration of the first portion is based on a selected speed of transmission of the plurality of different speeds of transmission, and wherein the duration of the first portion indicates the selected speed of transmission.

2. The method according to claim 1, wherein the first portion of the bit time associated with the start bit is between 60% and 90% of the bit time associated with the start bit.

3. The method according to claim 1, wherein the plurality of bits form a packet and wherein transmission of a first bit begins at the expiration of the bit time associated with the start bit.

4. The method according to claim 3, wherein the bit time associated with the start bit of the packet is longer than a bit time associated with other bits of the packet and the bit times associated with the other bits of the packet may be determined, by a known relationship, from the bit time associated with the start bit of the packet.

5. The method according to claim 4, wherein the other bits are transmitted by placing the link in only one state for each bit, the state depending on the logical value of the bit being transmitted.

6. The method according to claim 3, wherein steps of placing the link in one of the two different states and generating an additional transition over the link are performed for each bit of the packet, the transmission of a current bit, from a second bit up to a last bit, beginning at the expiration of the bit time associated with the latest preceding bit.

7. A processing unit configured for a plurality of bits over a serial link that is capable of taking two different states respectively associated with two possible logical values of the transmitted bits, the processing unit comprising a transmission processing unit configured to implement the method of claim 1.

8. The method according to claim 1, further comprising transmitting additional bits of the plurality of bits over the serial link, wherein each bit is transmitted during a corresponding bit time and has a one of the two possible logic values as indicated by either a first voltage level or a second voltage level during the duration of the of the corresponding bit time.

9. The method according to claim 1, further comprising changing the speed of transmission while transmitting the plurality of bits.

10. A method of transmitting a plurality of bits over a serial link that is capable of taking two different states respectively associated with two possible logical values of the transmitted bits, the method comprising:
    starting from a transmission start time of a start bit and up to expiration of a first portion of a bit time associated with the start bit, using a transmitter to place the link in one of the two different states depending on a logical value of the start bit;
    upon expiration of the first portion of the bit time associated with the start bit, using the transmitter to generate a first additional transition over the link so as to place the link in the other one of the two different states up to an expiration of the bit time associated with the start bit, wherein a duration of the first portion is based on a speed of transmission
    starting from a transmission start time of an other bit of the plurality of bits and up to expiration of a period counted starting from the transmission start time of the start bit and equal to a sum of all bit times associated with earlier bits preceding the other bit and of a second portion of the bit time associated with the other bit, placing the link in one of the two different states depending on the logical value of the other bit; and upon the expiration of the period, generating a second additional transition over the link so as to place the link in the other one of the two different states up to an expiration of the bit time associated with the other bit.

11. The method according to claim 10, wherein the first portion and the second portion are equal.

12. The method according to claim 10, wherein the start bit is the only earlier bit so that the period is equal to the bit time of the start bit.

13. The method according to claim 10, wherein a duration of the second portion is based on the speed of transmission.

14. A method for receiving a plurality of bits carried over a serial link that is capable of taking two different states that are associated with two possible logical values, the method comprising:

using a receiver capable of receiving at a plurality of different speeds of transmission to detect a first transition between the two states of the link, the first transition occurring at a time after a reception start time of a start bit;

using the receiver to determine a first period spanning from the reception start time to a time of occurrence of the first transition, a reception end time of the start bit being separated from the time of occurrence of the first transition by a first additional period that is equal to a first predetermined portion of the first period, wherein a duration of the first period is based on a speed of transmission of the plurality of different speeds of transmission;

detecting the speed of transmission based on the duration of the first period; and receiving additional bits of the plurality of bits based on the detected speed of transmission.

15. The method according to claim 14, wherein the first predetermined portion is between 10% and 70% of the first period.

16. The method according to claim 14, wherein the method comprises receiving a packet that comprises the plurality of bits, the start bit being a first bit of the plurality of bits, the method further comprising receiving a second bit beginning at an expiration of the first additional period associated with the first bit.

17. The method according to claim 16, wherein a bit time associated with the first bit of the received packet is longer than a bit time associated with other bits of the packet, the method further comprising determining the bit time associated with the other bits from the bit time associated with the first bit of the received packet using a known relationship.

18. The method according to claim 17, wherein the other bits are received while in only one state for each bit, the state depending on the logical value of the bit being transmitted.

19. The method according to claim 16, wherein all the bits of the packet have the same bit time, or have different bit times for some of them that are determinable by a known relationship, the method further comprising receiving an other bit of the packet, the receiving comprising:

detecting an occurrence of a second transition between the two states of the link after a reception start time of the other bit; and determining a second period spanning from the reception start time of the first bit to the time of occurrence of the second transition, and the reception end time of the other bit being separated from the time of occurrence of the second transition by a second additional period that is equal to a second predetermined portion of the second period.

20. The method according to claim 19, wherein the first additional period and the second additional period are the same.

21. The method according to claim 16, further comprising receiving each of the other bits of the packet after receiving the first bit, wherein receiving each of the other bits includes detecting an additional transition after a reception start time of that bit.

22. A processing unit configured to receive a packet of bits carried over a serial link, the processing unit comprising a reception processing unit configured to implement the method according to claim 14.

23. The method according to claim 14, further comprising receiving a first set of the plurality of bits at a first speed of transmission and receiving a second set of the plurality of bits at a second speed of transmission different from the first speed of transmission.

24. A method of communicating using a serial link, the method comprising:

using a transmitter capable to transmit at a plurality of different speeds of transmission to transmit an initial portion of a start bit for a first time period, the start bit having a start bit time, wherein the first time period is based on a selected speed of transmission of the plurality of different speeds of transmission, and wherein a duration of the first time period indicates the selected speed of transmission;

using the transmitter to transmit an additional portion of the start bit having a second time period, the additional portion having an inverse value of the initial portion and the start bit time being equal to a sum of the first time period and the second time period; and after the start bit time, using the transmitter to transmit a plurality of useful bits, each of the useful bits having a useful bit time, the start bit time being longer than the useful bit time and being an integer multiple of the useful bit time.

25. The method according to claim 24, further comprising:

receiving the initial portion of the start bit;
receiving the additional portion of the start bit;
determining the start bit time based on timing of receiving the initial portion and the additional portion;
determining the useful bit time based on the start bit time and the integer multiple; and
receiving the useful bits at a bit rate based on the useful bit time.

26. The method according to claim 24, wherein each useful bit is transmitted at only a single level based on a logical value of that useful bit.

27. The method according to claim 24, wherein the first time period is between 60% and 90% of the start bit time.

* * * * *